UNITED STATES PATENT OFFICE.

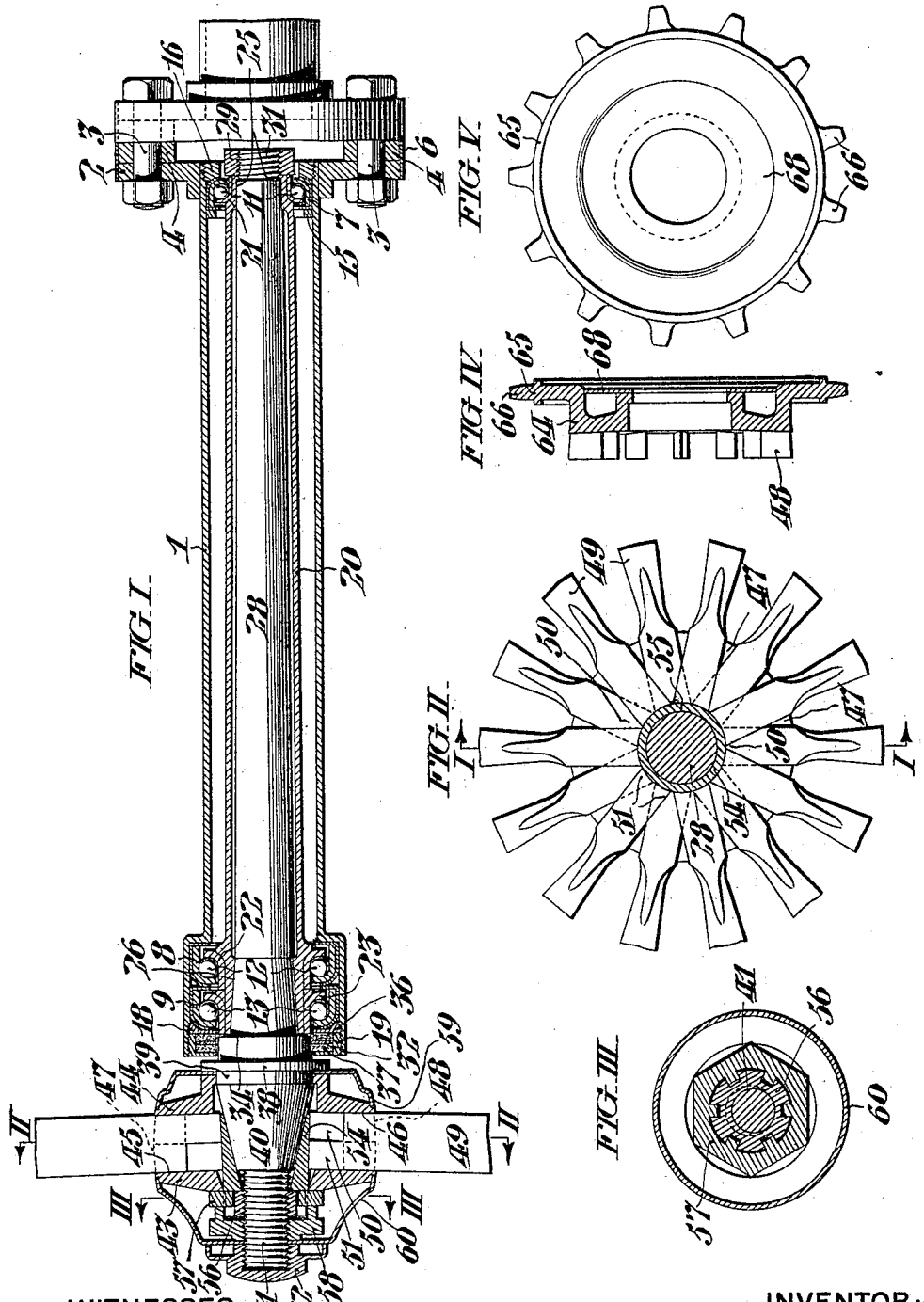

CHARLES B. VAN HORN, OF PHILADELPHIA, PENNSYLVANIA, ASSIGNOR, BY DIRECT AND MESNE ASSIGNMENTS, TO GUARANTEE TITLE AND TRUST CO., TRUSTEE, OF PITTSBURG, PENNSYLVANIA, A CORPORATION OF PENNSYLVANIA.

WHEEL.

No. 819,824.  Specification of Letters Patent.  Patented May 8, 1906.

Application filed June 27, 1905. Serial No. 267,213.

*To all whom it may concern:*

Be it known that I, CHARLES B. VAN HORN, of Philadelphia, in the State of Pennsylvania, have invented certain new and useful Improvements in Wheels, whereof the following is a specification, reference being had to the accompanying drawings.

My invention may be employed with particular advantage in spoked vehicle-wheels of the general class described in Letters Patent of the United States No. 693,929, granted to me February 25, 1902, although its use is not necessarily limited to wheels of that description.

As hereinafter described, my invention includes a wheel-hub comprising opposed complementary sections having recesses arranged to detachably engage spokes, adjustable wedging means arranged to thrust said spokes radially outward into engagement with a felly comprising a cone on an axle engaged in stationary relation with the hub, and a ball-bearing sleeve on said axle arranged to rotate in a tubular journal, which may be mounted in non-rotatable relation with a vehicle, which journal may support two such axles extending in alinement from wheels upon opposite sides of the vehicle and terminating between its sides, so that said wheels may be independently rotated.

My invention comprehends the various novel features of construction and arrangement hereinafter more definitely specified and claimed.

In the drawings, Figure I is a diametrical sectional view of a hub, axle-bearing sleeve, and tubular journal, taken on the line II II in Fig. II. Fig. II is a sectional view of said hub, taken on the line II II in Fig. I. Fig. III is a sectional view of said hub, taken on the line III III in Fig. I. Fig. IV is a diametrical sectional view of a separable hub-section provided with a sprocket-wheel by which the hub may be rotated. Fig. V is an inner face view of the hub-section shown in Fig. IV.

Referring to Figs. I to III, inclusive, 1 is a tubular journal-box formed of two sections joined at the median line of the vehicle by respective end flanges 2, connected by bolts 3, extending through the washers 4, said junction being covered by the band 6. Said journal-box 1 may be provided with any suitable connections to maintain it in non-rotary relation with the vehicle and comprises the ball-races 7, 8, and 9, respectively provided with bearing-balls 11, 12, and 13. The ball-race 7 is clamped against the stationary collar 15 in the journal 1 by the nut 16 at the end of the latter, and the ball-races 8 and 9 are clamped in the assembled position shown by the nuts 18 and 19. The axle-bearing sleeve 20 is fitted within said journal 1 and provided with the race-rings 21, 22, and 23, respectively opposed to the race-rings 7, 8, and 9 in said journal. Said sleeve has the conical seats 25 and 26 at its respectively inner and outer ends fitted to the axle 28, upon which it is retained in stationary relation by the nut 29, engaged with the screw-thread 31 on the inner end of said axle. Said nut 29 also serves to clamp the dust-guard ring 32 beween the outer end of said bearing-sleeve 20 and the shoulder 34 on said axle, the dust-guard washers 36 and 37 being interposed between the nuts 18 and 19 and said guard-ring 32 in the journal-box 1. Said axle 28 is provided at its outer end with the circumferential flange 38, cylindrical bearing 39, cone 40, and screw-thread 41. Said axle carries the two complementary hub-sections 43 and 44, having complementary recesses 45 and 46 between their projections 47 and 48, arranged in a circumferential series to receive the series of spokes 49, conveniently provided with wedge-shaped inner ends 50 and shoulders 51, which overlap and interengage in their assembled position, as shown in Fig. II. Said spokes 49 are adjustable radially outward into engagement with the felly by means of the expansible wedge ring 54, which is split, as indicated at 55 in Fig. II, and arranged to be shifted axially upon the cone 40 on the axle 28 by the nut 56, engaged with the screw-thread 41 on the end of said axle. Rotation of said nut 56 is conveniently effected by the wrench-ring 57, which is rotatably engaged therewith, as shown in Fig. III, so as to permit the axial movement of said nut while said wrench-ring is maintained in contact with the hub-section 43. Said hub-section 43 is maintained in proper relation with the hub-section 44 by the nut 58, which engages said screw-thread 41 and clamps said wrench-ring 57 against the hub-section 43, thus preventing accidental rotation of the nut 56. The hub above described is provided with an outer shell conveniently formed of pressed sheet metal in two sections 59 and 60, the former being clamped on the cylindrical bearing 39 between the axle-flange 38 and the hub-section 44, and the casing-section 60 being clamped against the nut 58 by the cap-nut 62, engaged with the end of the screw-thread 41.

It is to be understood that in the assembled position (shown in Fig. I) the spokes 49 are thrust outwardly in tight engagement with the felly, and the spokes 49, hub-sections 43 and 44, axle 28, and bearing-sleeve 20 are clamped in relatively stationary relation, so as to rotate together in the journal 1.

It is to be understood that two wheels provided with hubs of the construction above described may be mounted upon opposite sides of the vehicle with their axles in alinement in said journal 1, so as to permit their independent rotation, and said hubs may be provided with any convenient means for positively effecting their independent rotation. For instance, as shown in Figs. IV and V, the inner hub-section 64, otherwise constructed like the hub-section 44, above described, comprises the sprocket-wheel 65, whose teeth 66 may be engaged by a chain connected with a motor carried by the vehicle. In the last-named construction the casing-disk 68 is substituted for the casing-section 59.

I do not desire to limit myself to the precise details of construction and arrangement herein set forth, as it is obvious that various modifications may be made therein without departing from the essential features of my invention.

I claim—

1. The combination with a hub provided with spoke-recesses arranged in a circumferential series; of adjustable means in said hub arranged to thrust spokes outwardly in said recesses; an axle fitted in said hub; and, means securing said axle in stationary relation with said hub, substantially as set forth.

2. The combination with a hub provided with spoke-recesses arranged in a circumferential series; of an axle fitted in said hub; means securing said axle in stationary relation with said hub; and, adjustable means carried by said axle arranged to thrust spokes outwardly in said recesses, substantially as set forth.

3. The combination with a hub provided with spoke-recesses arranged in a circumferential series; of an axle fitted in said hub; means securing said axle in stationary relation with said hub; and adjustable means carried by said axle arranged to thrust spokes outwardly in said recesses, comprising a cone on said axle and a wedge bearing on said cone, substantially as set forth.

4. The combination with a hub provided with spoke-recesses arranged in a circumferential series; of an axle fitted in said hub; means securing said axle in stationary relation with said hub; adjustable means carried by said axle arranged to thrust spokes outwardly in said recesses, comprising a cone on said axle and a wedge bearing on said cone; and a nut on said axle arranged to shift said wedge axially on said cone, substantially as set forth.

5. The combination with a hub provided with spoke-recesses arranged in a circumferential series; of an axle fitted in said hub in stationary relation therewith; a cone on said axle; wedging means arranged to be shifted axially on said cone and thrust radially in opposition to said recesses, substantially as set forth.

6. The combination with a hub comprising opposed complementary sections having spoke-recesses arranged in a circumferential series; of an axle fitted in said hub; means on said axle arranged to clamp said hub-sections and axle in relatively stationary relation; a cone on said axle; a wedge ring fitted to said cone; and, means arranged to shift said wedge ring axially on said cone and expand said ring radially in opposition to said recesses, substantially as set forth.

7. The combination with a hub provided with spoke-recesses arranged in a circumferential series; of an axle fitted in said hub in stationary relation therewith; adjustable means in said hub arranged to thrust spokes outwardly in said recesses; a bearing-sleeve secured on said axle in stationary relation therewith; and, a journal in which said sleeve and axle are mounted to rotate, substantially as set forth.

8. The combination with a hub provided with spoke-recesses arranged in a circumferential series; of an axle fitted in said hub in stationary relation therewith; means in said hub adjustable to thrust spokes outwardly in said recesses; and, a tubular journal in which said axle is mounted to rotate, substantially as set forth.

9. The combination with a tubular journal comprising opposite complementary sections; of bearing-sleeves mounted to rotate at the respectively opposite ends of said journal; independent axles carried by said sleeves; hubs secured in respectively stationary relation with said axles, each comprising a circumferential series of spoke-recesses; and, adjustable means in said hubs arranged to thrust spokes outwardly in said recesses, substantially as set forth.

In testimony whereof I have hereunto signed my name, at Philadelphia, Pennsylvania, this 24th day of June, 1905.

CHARLES B. VAN HORN.

Witnesses:
ARTHUR E. PAIGE,
CLIFTON C. HALLOWELL.